(12) United States Patent
Lee et al.

(10) Patent No.: US 6,741,300 B2
(45) Date of Patent: May 25, 2004

(54) LIQUID CRYSTAL DISPLAY DEVICE

(75) Inventors: Cheng-Chang Lee, Taipei Hsien (TW); Hung Huang-Lung, Taipei Hsien (TW); Li Chien-Te, Taipei Hsien (TW); Su-Shen Lun, Taipei Hsien (TW); Liu Ying-Huang, Taipei Hsien (TW)

(73) Assignees: Wistron Corp., Taipei (TW); Acer Inc., Taipei Hsien (TW); Au Optronics Corp., Hsinchu (TW)

( * ) Notice: Subject to any disclaimer, the term of this patent is extended or adjusted under 35 U.S.C. 154(b) by 177 days.

(21) Appl. No.: 10/010,494

(22) Filed: Nov. 12, 2001

(65) Prior Publication Data

US 2003/0035077 A1 Feb. 20, 2003

(30) Foreign Application Priority Data

Aug. 14, 2001 (TW) .................................... 90119862 A

(51) Int. Cl.⁷ .................... G02F 1/1333; H05F 1/16; H05K 5/00
(52) U.S. Cl. .................... 349/58; 361/681; 361/752
(58) Field of Search .................... 349/58; 361/681, 361/752

(56) References Cited

U.S. PATENT DOCUMENTS 5,905,550 A * 5/1999 Ohgami et al. .............. 349/58
5,946,061 A * 8/1999 Kurihara et al. ............. 349/58
6,392,723 B1 * 5/2002 Sugiyama et al. ........... 349/58
6,480,307 B1 * 11/2002 Yang ........................... 359/15
6,507,484 B2 * 1/2003 Fukuyoshi ................... 361/681

\* cited by examiner

Primary Examiner—Toan Ton
Assistant Examiner—Hoan Nguyen
(74) Attorney, Agent, or Firm—Ladas & Parry

(57) ABSTRACT

A liquid crystal display device is provided. The liquid crystal display device comprises a frame, a back light unit, a liquid crystal panel, a first cover and a second cover. The frame is provided with at least one first connecting member. The back light unit is disposed on the frame, and the liquid crystal panel is disposed on the back light unit. The first cover is provided with at least one second connecting member, and it combines with the frame by the engagement between the first connecting member and the second connecting member. The second cover is provided with at least one third connecting member, and it combines with the frame by the engagement between the first connecting member and the third connecting member. The frame, the back light unit and the liquid crystal panel are located between the first cover and the second cover.

10 Claims, 9 Drawing Sheets

LIQUID CRYSTAL DISPLAY DEVICE

BACKGROUND OF THE INVENTION

1. Field of the Invention

The invention relates to a liquid crystal display device; in particular, the invention relates to a liquid crystal display device with minimized thickness.

2. Description of the Related Art

Referring to FIG. 1, a conventional liquid crystal display device 30 comprises a liquid crystal display unit 31, a rear case 33 and a front case 32. At the side surface of the liquid crystal display unit 31, first screw holes 311a are formed. At the side surface of the rear case 33, second screw holes 331 are formed. The rear case 33 combines with the liquid crystal display unit 31 by screws 34 that are locked to the first screw holes 311a and the second screw holes 331.

Referring to FIG. 2, the liquid crystal display unit 31 comprises a first frame 311. On the first frame 311, a reflector 3121, a light guide 3122, a protection sheet 3123, a first prism sheet 3124, a second prism sheet 3125, a diffuser 3126, and a liquid crystal panel 313 are stacked sequentially. The reflector 3121, the light guide 3122, the protection sheet 3123, the first prism sheet 3124, the second prism sheet 3125. The diffuser 3126 generally consists of a back light unit 312. At the side surface of the first frame 311, the first screw holes 311a are formed.

In order to join the plastic first frame 311, the back light unit 312 and the liquid crystal panel 313, a second frame 314 made of metal is mounted at the side surface of the first frame 311. At the side surface of the second frame 314, third screw holes 314a, corresponding to the first screw holes 311a respectively, are formed.

Referring to FIG. 3, a notebook computer 2, having the above liquid crystal display device 30, is shown. The liquid crystal display device 30 is rotatably disposed on a body 40.

During the assembly of the conventional liquid crystal display device 30, all parts of the liquid crystal unit 31 are firstly joined together. Then, the liquid crystal unit 31 combines with the front case 32 and the rear case 33. Thus, the first frame 311 and the second frame 314 are necessary parts in the conventional liquid crystal display device 30. Due to all of the necessary parts in the conventional liquid crystal display device 30, the thickness of the conventional liquid crystal display device 30 cannot be minimized furthermore.

SUMMARY OF THE INVENTION

In order to address the disadvantages of the aforementioned liquid crystal display device, the invention provides a liquid crystal display device of minimized thickness. As well, this invention does not follow the conventional design concept of liquid crystal display device in that the design of the covers is independent.

Accordingly, the liquid crystal display device of this invention comprises a frame, a back light unit, a liquid crystal panel, a first cover and a second cover. The frame is provided with at least one first connecting member. The back light unit is disposed on the frame, and the liquid crystal panel is disposed on the back light unit. The first cover is provided with at least one second connecting member, and it combines with the frame by engagement between the first connecting member and the second connecting member. The second cover is provided with at least one third connecting member, and it combines with the frame by engagement between the first connecting member and the third connecting member. The frame, the back light unit and the liquid crystal panel are located between the first cover and the second cover.

Furthermore, the first connecting member is provided with a first slot and a second slot. The second connecting member is a first protrusion corresponding to the first slot, and the third connecting member is a second protrusion corresponding to the second slot. The first cover combines with the frame by the engagement between the first slot and the first protrusion, and the second cover combines with the frame by the engagement between the second slot and the second protrusion.

Furthermore, the first protrusion, engaging with the first slot, is not in contact with the second protrusion engaging with the second slot.

Furthermore, the first connecting member is made of plastic.

Furthermore, the back light unit comprises a reflector, a light guide, a first diffuser, a first prism sheet, a second prism sheet and a second diffuser. The reflector is disposed on the frame, and the light guide is disposed on the reflector. The first diffuser is disposed on the light guide, and the first prism sheet is disposed on the first diffuser. The second prism sheet is disposed on the first prism sheet, and the second diffuser is disposed on the second prism sheet.

In a preferred embodiment, this invention provides a notebook computer that comprises a body and the above liquid crystal display device rotatably disposed on the body.

BRIEF DESCRIPTION OF THE DRAWINGS

The invention is hereinafter described in detail with reference to the accompanying drawings in which.

DETAILED DESCRIPTION OF THE INVENTION

Figure 4A:
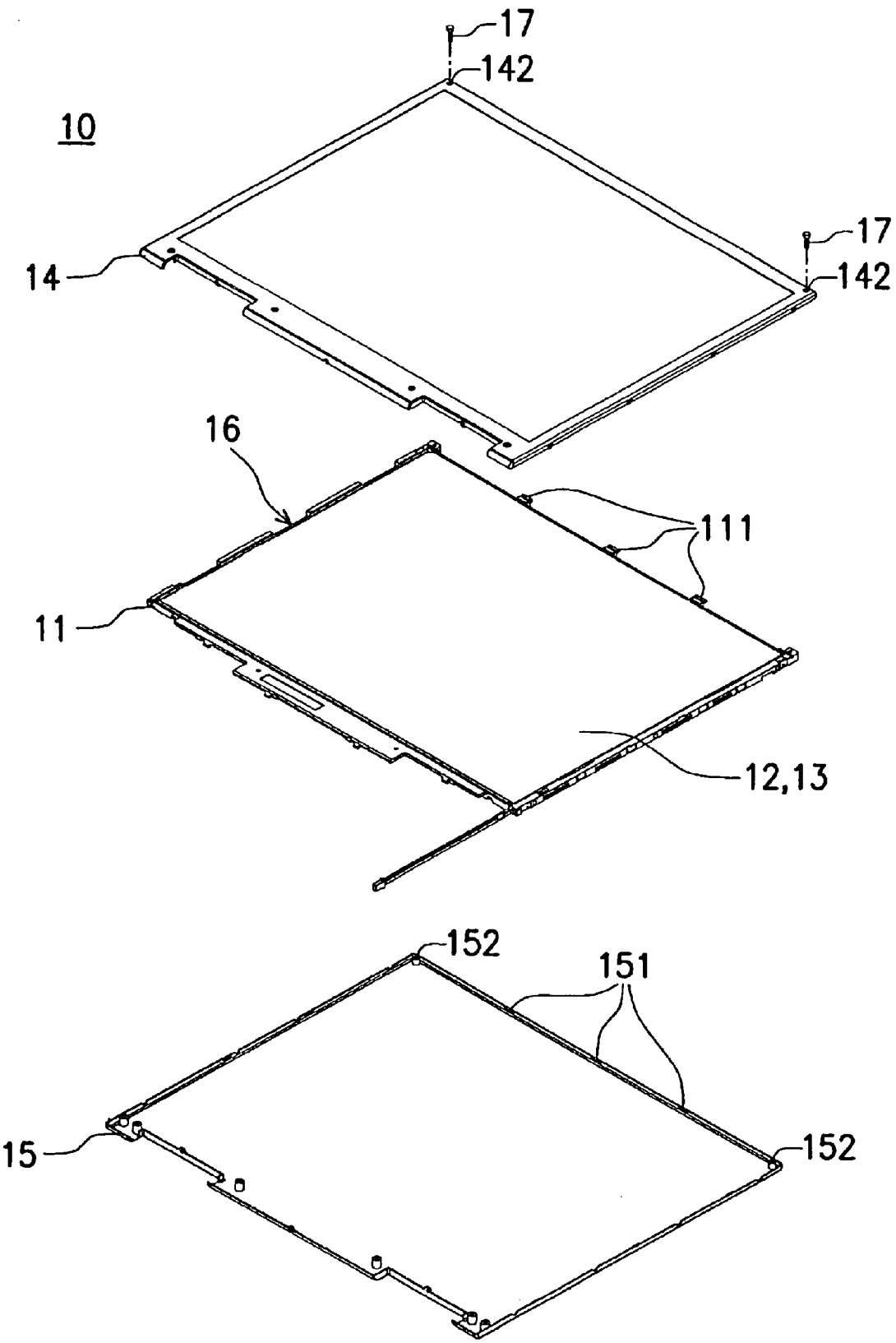
FIG. 4a is a schematic view depicting a liquid crystal display device as disclosed in this invention.
Figure 4B:
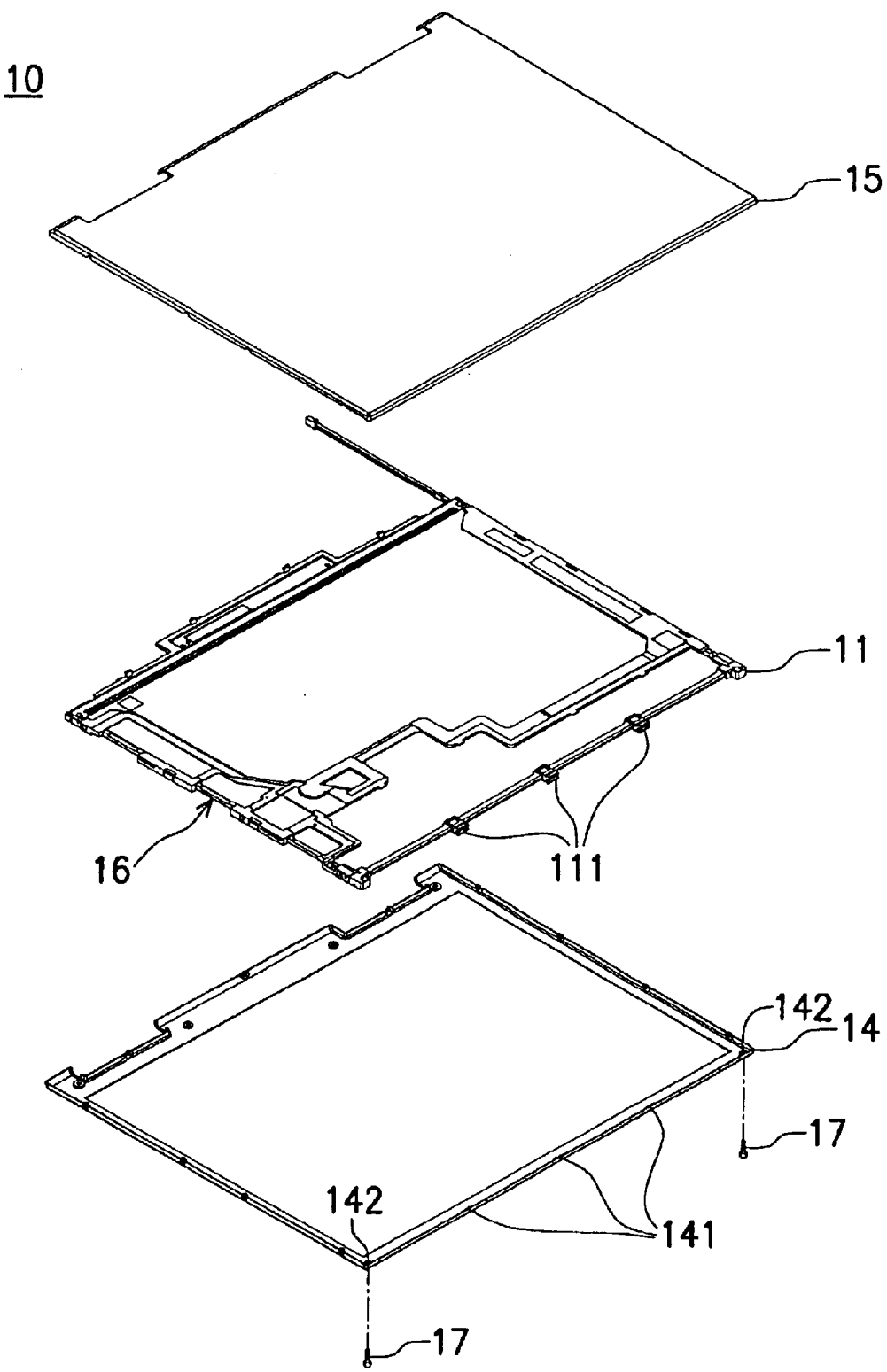
FIG. 4b is another schematic view depicting a liquid crystal display device as disclosed in this invention.

Referring to FIG. 4a and FIG. 4b, a liquid crystal display device 10 of this invention comprises a liquid crystal display unit 16, a first cover 14 and a second cover 15.

Figure 5:
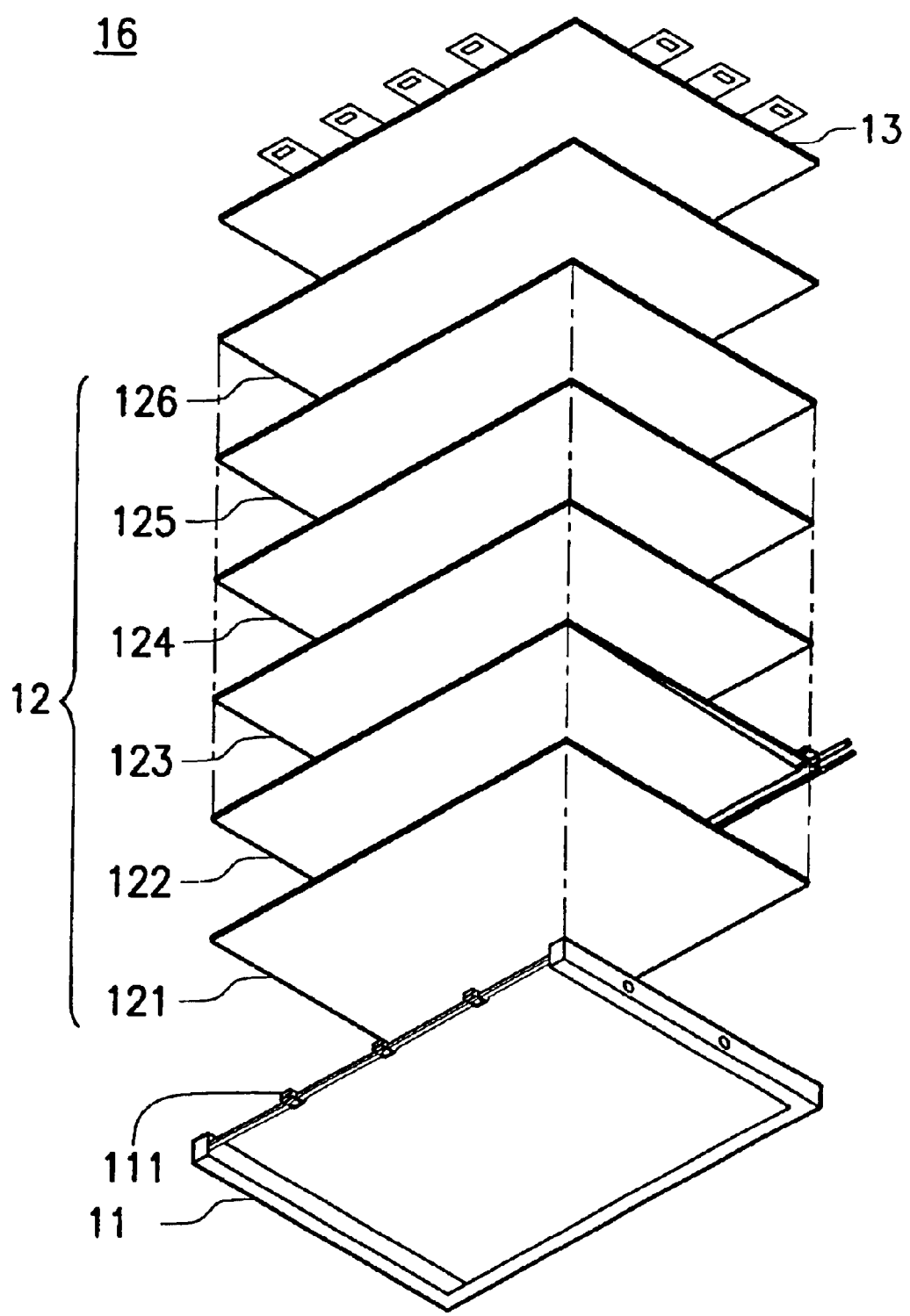
FIG. 5 is an exploded view depicting a liquid crystal display unit as disclosed in this invention.

Referring to FIG. 5, the liquid crystal display unit 16 comprises a frame 11, a back light unit 12, and a liquid crystal panel 13. The back light unit 12 is disposed on the frame 11, and comprises a reflector 121, a light guide 122, a first diffuser 123, a first prism sheet 124, a second prism sheet 125 and a second diffuser 126. The reflector 121 is disposed on the frame 11, and the light guide 122 is disposed on the reflector 121. The first diffuser 123 is disposed on the light guide 122, and the first prism sheet 124 is disposed on the first diffuser 123. The second prism sheet 125 is disposed on the first prism sheet 124, and the second diffuser 126 is disposed on the second prism sheet 125.

The liquid crystal panel 13 is disposed on the second diffuser 126 of the back light unit 12. The frame 11 is provided with three first connecting members 111. Each of the first connecting members 111 is provided with a first slot 111a and a second slot 111b.

Figure 1:
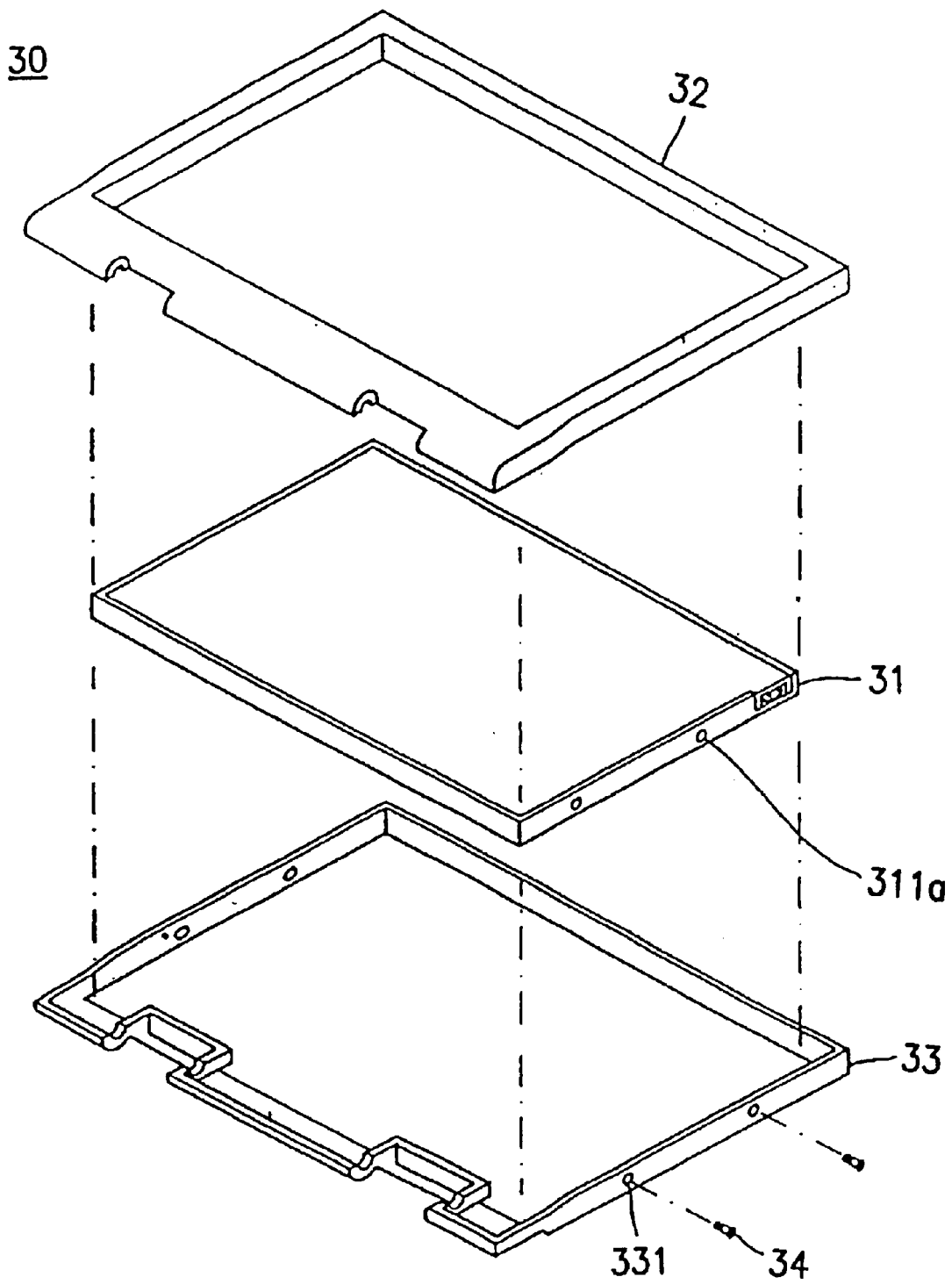
FIG. 1 is an exploded view depicting a conventional liquid crystal display device.
Figure 2:
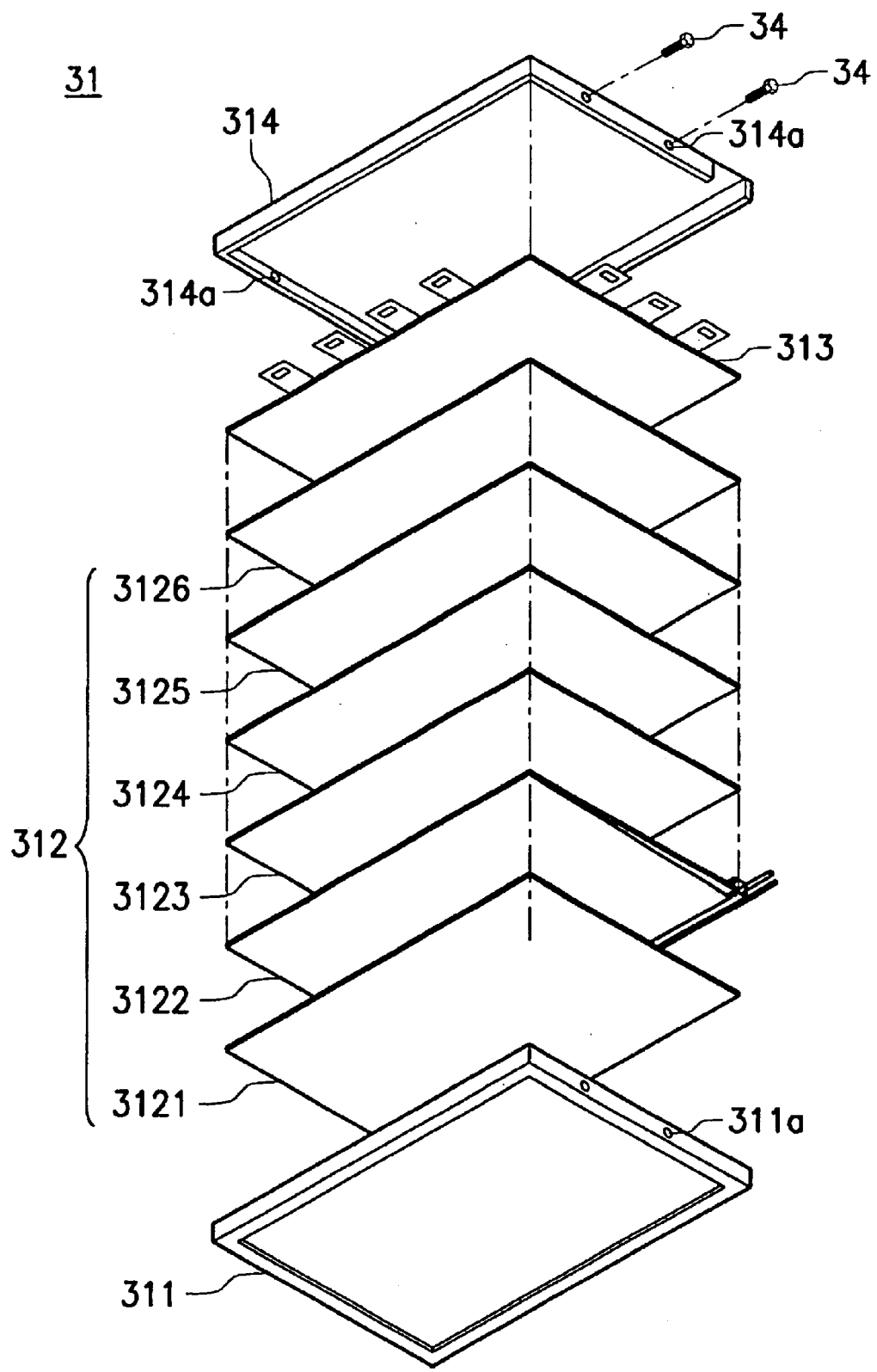
FIG. 2 is an exploded view depicting a conventional liquid crystal display unit.
Figure 3:
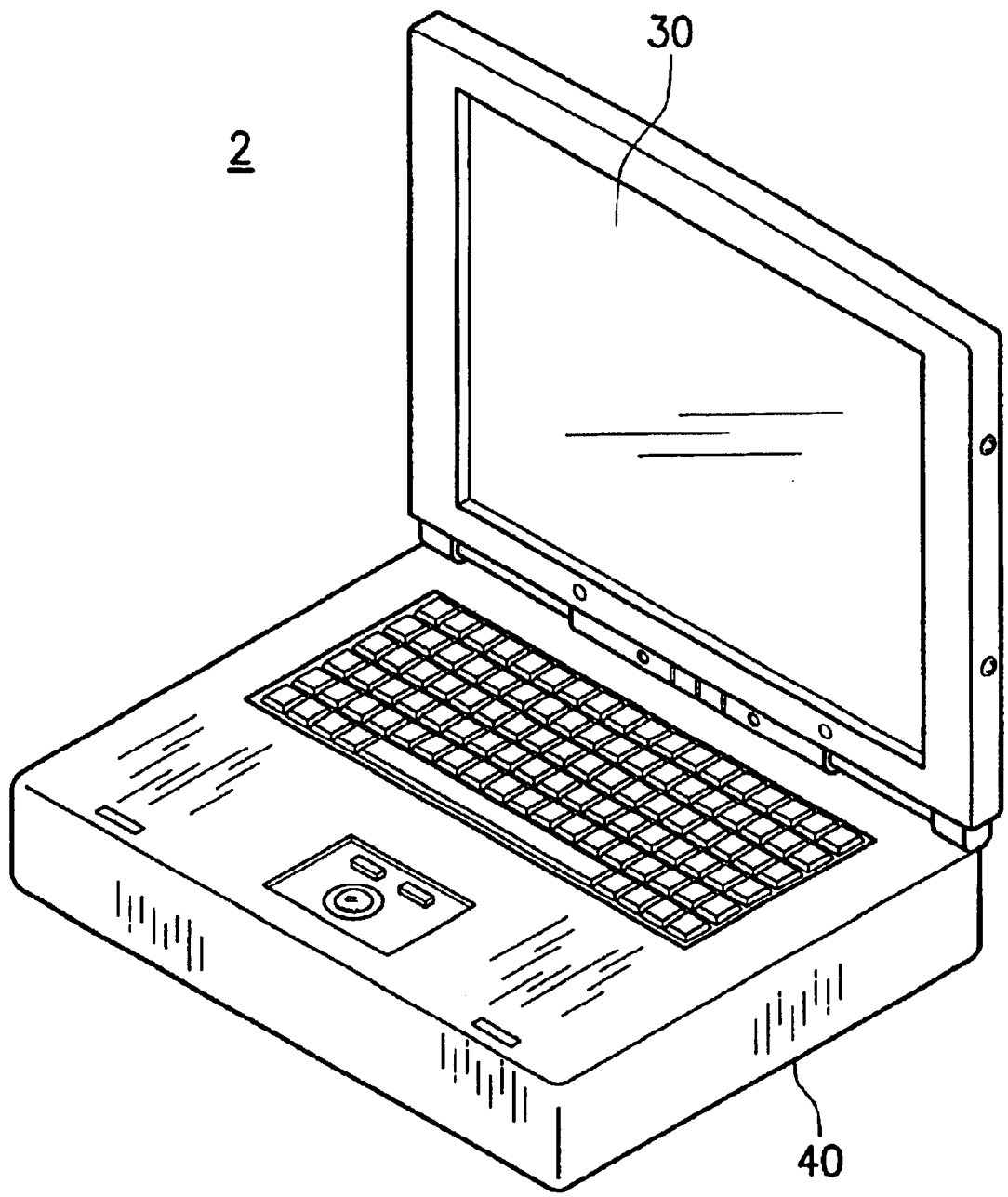
FIG. 3 is a schematic view depicting a conventional notebook computer.

Comparing the conventional liquid crystal display device 30 as shown in FIG. 2 and the liquid crystal display device 10 of this invention as shown in FIG. 5, the conventional second frame 314 is omitted in this invention, and the first connecting member 111 is additionally disposed on the frame 11 as disclosed in this invention.

Referring to FIG. 4a, FIG. 4b, FIG. 6a and FIG. 6b, the first cover 14 is provided with three first protrusions 141 (second connecting member) and two through holes 142. Each of the first protrusions 141 corresponds to a first slot 111a of the first connecting member 111 respectively. The second cover 15 is provided with three second protrusions 151 (third connecting member) and two screw holes 152. Each of the second protrusions 151 corresponds to a second slot 111b of the first connecting member 111 respectively. Each of the screw holes 152 corresponds to the through holes 142 respectively. Thus, the first cover 14 combines with the frame 11 by the engagement between the first slots 111a and the first protrusions 141. The second cover 15 combines with the frame 11 by the engagement between the second slots 111b and the second protrusions 151. Accordingly, the liquid crystal display unit 16 is fixedly located between the first cover 14 and the second cover 15.

Figure 6A:
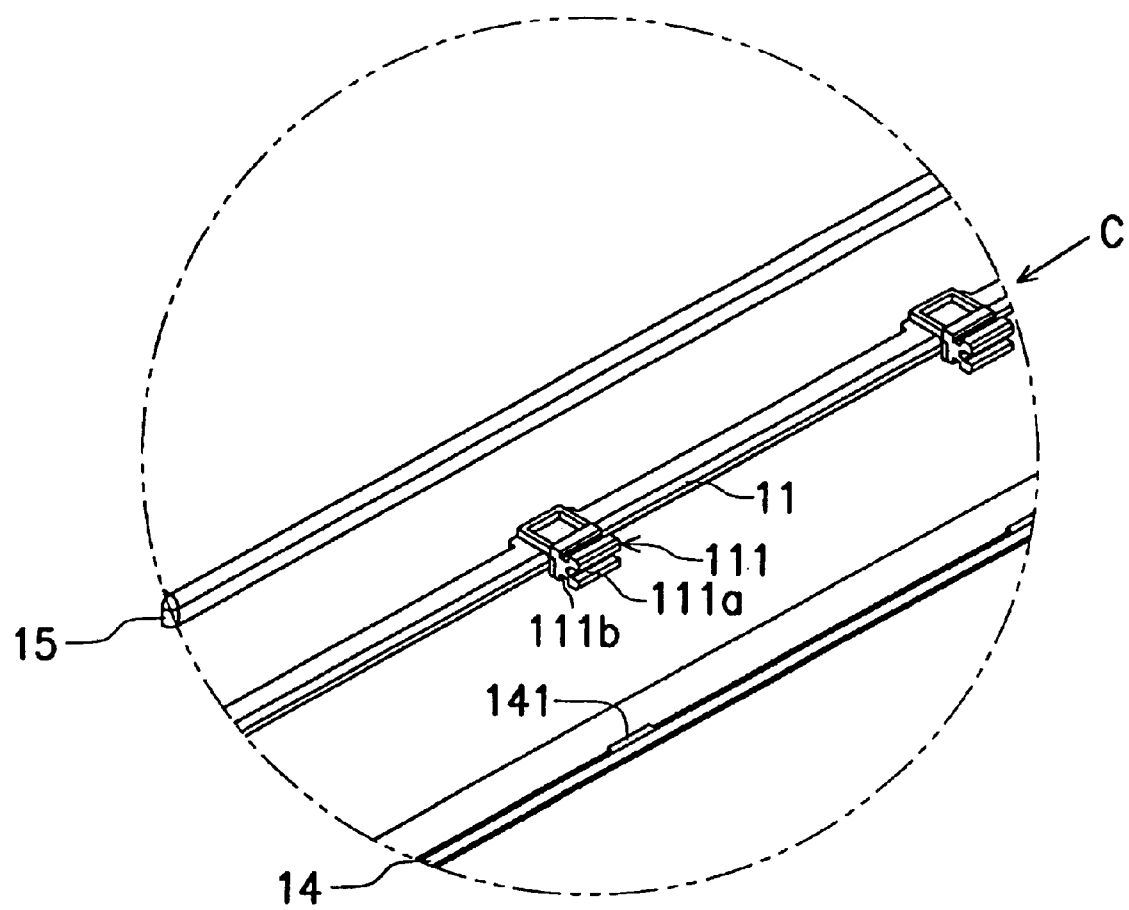
FIG. 6a is an enlarged view depicting a liquid crystal display unit as disclosed in this invention.
Figure 6B:
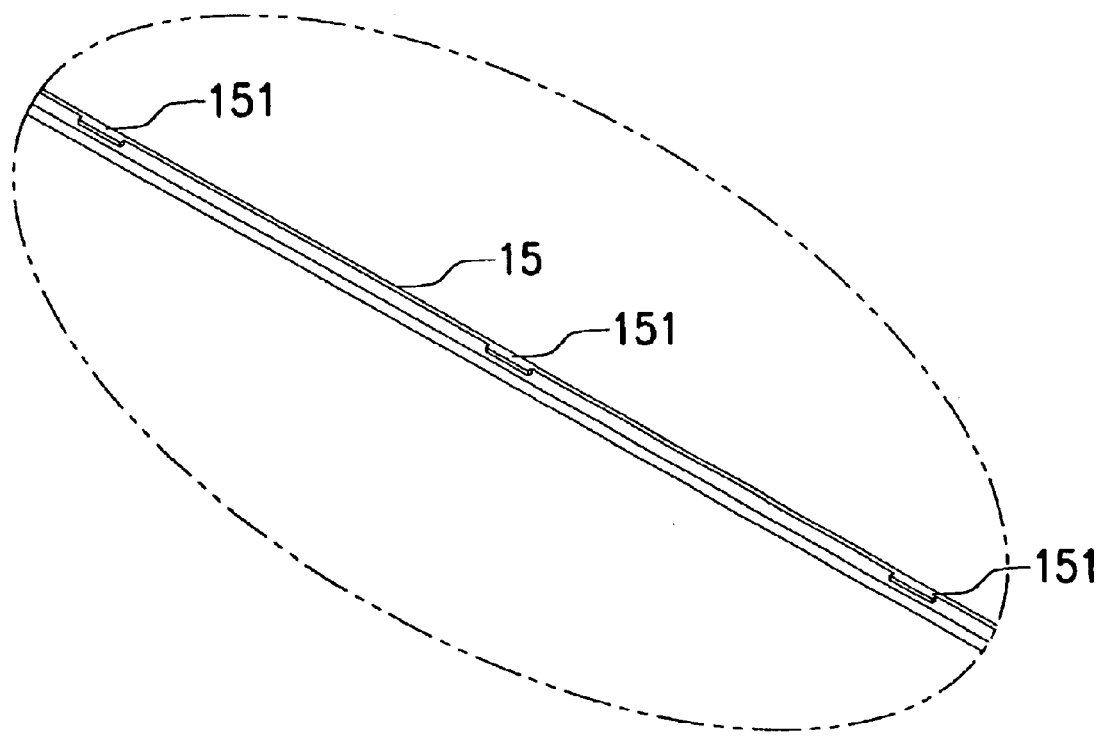
FIG. 6b is an enlarged view depicting a first cover.
Figure 6C:
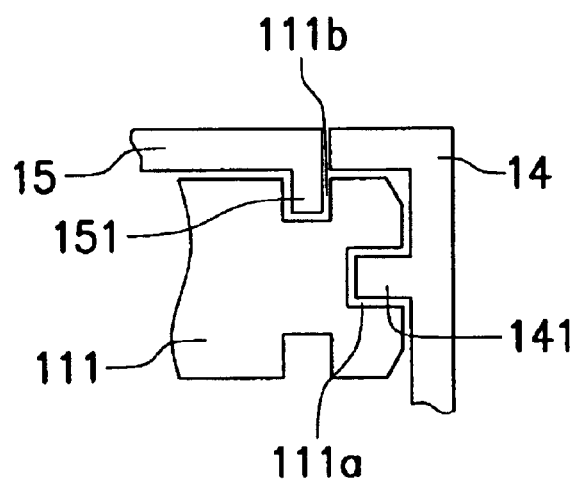
FIG. 6c is an enlarged view depicting the liquid crystal display unit, wherein a first connecting member combines with a first protrusion and a second protrusion.

FIG. 6c is a cross-section depicting part of the liquid crystal display device 30, wherein the first slot 111a engages with the first protrusion 141, and the second slots 111b engages with the second protrusions 151. It is noted that the first protrusion 141, engaging with the first slot 111a, is not in contact with the second protrusion 151 engaging with the second slot 111b.

The first connecting member 111 is preferably made of plastic so that it is more elastic during the assembly with the first cover 14 and the second cover 15.

In addition, the liquid crystal display device 10 further comprises two screws 17 for screwing into the screw holes 152 of the second cover 15 through the through holes 142 of the first cover 14. Hence, it is convenient to join first cover 14 and the second cover 15.

Figure 7:
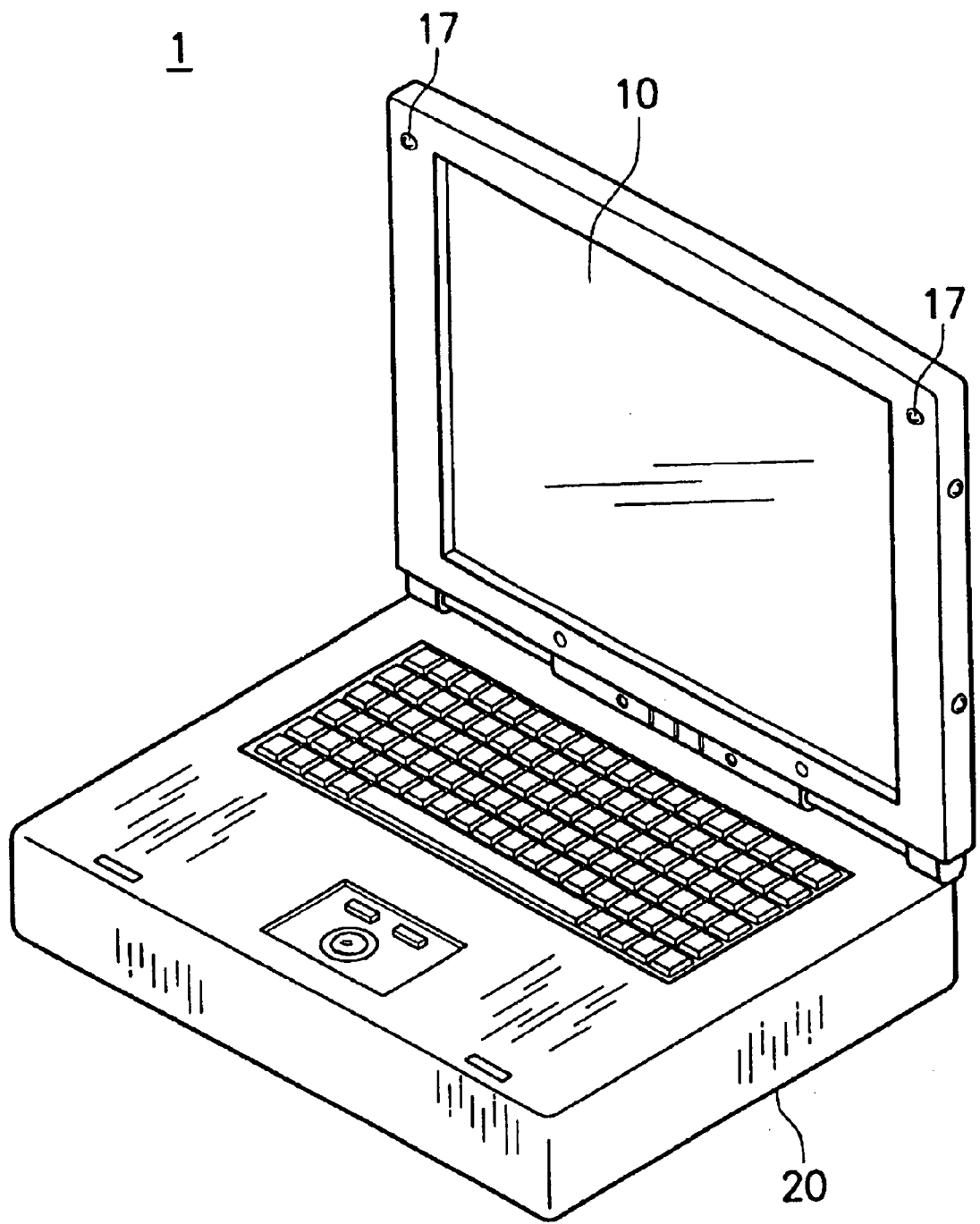
FIG. 7 is a schematic view depicting a notebook computer as disclosed in this invention.

FIG. 7 is a schematic view depicting a notebook computer 1, as disclosed in this invention, that comprises a body 20 and the above liquid crystal display device 10 rotatably disposed on the body 20.

It is noted that the amount of parts of this invention is not limited as long as it can attain certain function.

Since the design of the liquid crystal display unit and the design of the covers are combined together in this invention, two frames of the conventional liquid crystal display device are replaced by only one frame. As a result, the thickness of the liquid crystal display device is minimized. In addition, the liquid crystal display devices of this invention are mass-produceable.

While the invention has been particularly shown and described with reference to a preferred embodiment, it will be readily appreciated by those of ordinary skill in the art that various changes and modifications may be made without departing from the spirit and scope of the invention. It is intended that the claims be interpreted to cover the disclosed embodiment, those alternatives which have been discussed above, and all equivalents thereto.

What is claimed is:

1. A liquid crystal display device comprising:
   a frame having at least one first connecting member made of plastic;
   a back light unit disposed on the frame;
   a liquid crystal panel disposed on the back light unit;
   a first cover having at least one second connecting member, wherein the first cover combines with the frame by the engagement between the first connecting member and the second connecting member; and
   a second cover having at least one third connecting member, wherein the second cover combines with the frame by the engagement between the first connecting member and the third connecting member while the frame, the back light unit and the liquid crystal panel are located between the first cover and the second cover.

2. The liquid crystal display device as claimed in claim 1, wherein the first connecting member is provided with a first slot and a second slot, and the second connecting member is a first protrusion corresponding to the first slot, and the third connecting member is a second protrusion corresponding to the second slot, whereby the first cover combines with the frame by the engagement between the first slot and the first protrusion, and the second cover combines with the frame by the engagement between the second slot and the second protrusion.

3. The liquid crystal display device as claimed in claim 2, wherein the first protrusion, engaging with the first slot, is not in contact with the second protrusion engaging with the second slot.

4. The liquid crystal display device as claimed in claim 3, wherein the back light unit comprises:
   a reflector disposed on the frame;
   a light guide disposed on the reflector;
   a first diffuser disposed on the light guide;
   a first prism sheet disposed on the first diffuser;
   a second prism sheet disposed on the first prism sheet; and
   a second diffuser disposed on the second prism sheet.

5. The liquid crystal display device as claimed in claim 1, wherein the back light unit comprises:
   a reflector disposed on the frame;
   a light guide disposed on the reflector;
   a first diffuser disposed on the light guide;
   a first prism sheet disposed on the first diffuser;
   a second prism sheet disposed on the first prism sheet; and
   a second diffuser disposed on the second prism sheet.

6. A notebook computer comprising a body and a liquid crystal display device rotatably disposed on the body, wherein the liquid crystal display device comprises:
   a frame having at least one first connecting member made of plastic;
   a back light unit disposed on the frame;
   a liquid crystal panel disposed on the back light unit;
   a first cover having at least one second connecting member, wherein the first cover combines with the frame by the engagement between the first connecting member and the second connecting member; and a second cover having at least one third connecting member, wherein the second cover combines with the frame by the engagement between the first connecting member and the third connecting member while the frame, the back light unit and the liquid crystal panel are located between the first cover and the second cover.

7. The notebook computer as claimed in claim 6, wherein the first connecting member is provided with a first slot and a second slot, and the second connecting member is a first protrusion corresponding to the first slot, and the third connecting member is a second protrusion corresponding to the second slot, whereby the first cover combines with the frame by the engagement between the first slot and the first protrusion, and the second cover combines with the frame by the engagement between the second slot and the second protrusion.

8. The notebook computer as claimed in claim 7, wherein the first protrusion, engaging with the first slot, is not in contact with the second protrusion engaging with the second slot.

9. The liquid crystal display device as claimed in claim 8, wherein the back light unit comprises:

a reflector disposed on the frame;

a light guide disposed on the reflector:

a first diffuser disposed on the light guide;

a first prism sheet disposed on the first diffuser;

a second prism sheet disposed on the first prism sheet; and a second diffuser disposed on the second prism sheet.

10. The notebook computer as claimed in claim 6, wherein the back light unit comprises:

a reflector disposed on the frame;

a light guide disposed on the reflector;

a first diffuser disposed on the light guide;

a first prism sheet disposed on the first diffuser;

a second prism sheet disposed on the first prism sheet; and a second diffuser disposed on the second prism sheet.

* * * * *